United States Patent
Jang

(10) Patent No.: US 9,559,933 B2
(45) Date of Patent: Jan. 31, 2017

(54) METHOD AND APPARATUS FOR PERFORMING CAPABILITY DISCOVERY OF RICH COMMUNICATION SUITE IN A PORTABLE TERMINAL

(71) Applicant: Samsung Electronics Co. Ltd., Suwon-si, Gyeonggi-do (KR)

(72) Inventor: Jae-Young Jang, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 599 days.

(21) Appl. No.: 13/919,402

(22) Filed: Jun. 17, 2013

(65) Prior Publication Data

US 2013/0339520 A1 Dec. 19, 2013

(30) Foreign Application Priority Data

Jun. 18, 2012 (KR) .................. 10-2012-0064976

(51) Int. Cl.
| | |
|---|---|
| G06F 15/16 | (2006.01) |
| H04L 12/26 | (2006.01) |
| H04L 29/12 | (2006.01) |
| G06F 3/0488 | (2013.01) |
| H04W 4/00 | (2009.01) |
| G06F 3/0485 | (2013.01) |
| H04M 1/2745 | (2006.01) |

(52) U.S. Cl.
CPC ............ H04L 43/10 (2013.01); G06F 3/0488 (2013.01); H04L 61/1594 (2013.01); H04M 1/274508 (2013.01); H04W 4/001 (2013.01); G06F 3/0485 (2013.01); H04M 1/274525 (2013.01); H04M 2250/60 (2013.01)

(58) Field of Classification Search
CPC . H04L 61/15–61/1594; H04L 41/0813–41/082
See application file for complete search history.

(56) References Cited

U.S. PATENT DOCUMENTS

| | | | | |
|---|---|---|---|---|
| 5,822,597 A | * | 10/1998 | Kawano | ................ G06F 1/3203 713/323 |
| 6,606,381 B1 | * | 8/2003 | Wunsch | .......... H04M 1/274583 379/142.06 |
| 7,360,082 B1 | * | 4/2008 | Berthold | ............. H04L 63/0823 713/157 |

(Continued)

OTHER PUBLICATIONS

"Rich Communication Suite 5.0 Advanced Communications Services and Client Specification; Version 1.0", XP055077342, Apr. 19, 2012.

Primary Examiner — Brendan Higa
(74) Attorney, Agent, or Firm — Jefferson IP Law, LLP

(57) ABSTRACT

A method of performing capability discovery of Rich Communication Suite (RCS) in a portable terminal is provided. The method includes displaying a predetermined number of pieces of contact information from among registered contact information when a displaying of the registered contact information is requested, displaying the registered contact information so as to correspond with a user input when the user input is determined, and selecting currently displayed contact information and performing capability discovery with respect to the selected displayed contact information, when the user input is not determined during a predetermined time.

12 Claims, 6 Drawing Sheets

(56) References Cited

U.S. PATENT DOCUMENTS

| | | | |
|---|---|---|---|
| 8,095,665 B1* | 1/2012 | Bau | G06Q 10/103 |
| | | | 709/227 |
| 2005/0041793 A1* | 2/2005 | Fulton | H04M 3/42263 |
| | | | 379/211.01 |
| 2005/0132302 A1* | 6/2005 | Cina | H04L 67/36 |
| | | | 715/814 |
| 2006/0085415 A1* | 4/2006 | Jian | G06F 17/30911 |
| 2009/0054091 A1* | 2/2009 | van Wijk | H04L 67/24 |
| | | | 455/466 |
| 2010/0199180 A1 | 8/2010 | Brichter | |
| 2013/0159874 A1* | 6/2013 | Bhogal | G06F 3/1454 |
| | | | 715/747 |

* cited by examiner

| RCS-e service | Tag |
|---|---|
| IM/Chat | +g.3gpp.iari-ref="urn%3Aurn-7%3agpp-application.ims.iari.rcse.im" |
| File transfer | +g.3gpp.iari-ref="urn%3Aurn-7%3agpp-application.ims.iari.rcse.ft" |
| Image share | +g.3gpp.iari-ref="urn%3Aurn-7%3agpp-application.ims.iari.gsma-is" |
| Video share | +g.3gpp.cs-voice |

FIG. 1B

METHOD AND APPARATUS FOR PERFORMING CAPABILITY DISCOVERY OF RICH COMMUNICATION SUITE IN A PORTABLE TERMINAL

PRIORITY

This application claims the benefit under 35 U.S.C. §119(a) of a Korean patent application filed on Jun. 18, 2012 in the Korean Intellectual Property Office and assigned Serial No. 10-2012-0064976, the entire disclosure of which is hereby incorporated by reference.

BACKGROUND OF THE INVENTION

1. Field of the Invention

The present invention relates to a portable terminal. More particularly, the present invention relates to performing capability discovery associated with the use of a Rich Communication Suite (RCS) service with respect to contact information stored in a phonebook.

2. Description of the Related Art

Rich Communication Suite (RCS) and RCS-enhanced (RCS-e) services provide various communication functions to users of a portable terminal through a communication network, based on the standard specifications set by the Global System for Mobile Communication Association (GSMA).

The RCS (or RCS-e) is being globally expanded from Europe to other parts of the world such as Korea, the United States, and the like, and provides various communication functions such as an enriched call function that shares a multimedia file, for example, a moving picture, a picture, and the like during a call, an enhanced phonebook function that obtains information associated with a communication partner registered in a phonebook in real time, an enriched messaging function that shares a file during chatting, and the like.

To utilize the RCS service that provides the various communication functions as described in the foregoing, a process of determining whether a portable terminal of a communication partner supports the RCS service may be employed. For example, a portable terminal of a user performs a process of determining whether the RCS service is supported with respect to each piece of contact information registered in a phonebook, and the process is referred to as capability discovery.

However, in the case of capability discovery performed in the current RCS service, the capability discovery is performed with respect to all contact information registered in the phonebook, and thus a large amount of time may be expended until the capability discovery with respect to all contact information is completed. This may cause a problem in that an available use time of a portable terminal is decreased since a battery charge of the portable terminal that performs the capability discovery is rapidly consumed, and a further problem in that a user is charged for data, since data traffic associated with the capability discovery is generated. The amounts of time, battery usage, and data traffic used increase with the amount of contact information in the phonebook. Thus, for example, a user who accumulates phonebook entries over time and transfers them to each new portable terminal he uses will use up a significant amount of battery charge, time, and data traffic when his portable terminal performs the RCS capability discovery with the phonebook information.

Therefore, there is a need to improve the related-art capability discovery performing method for the RCS service so as to minimize the consumption of a battery of a portable terminal and an amount of data traffic generated.

Therefore, a need exists for an improved system and method for performing a capability discovery of RCS in a portable terminal.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a capability discovery method that prevents data traffic from being excessively generated in a communication network, and that minimizes the consumption of a battery charge of a portable terminal when the portable terminal using the Rich Communication Suite (RCS) or RCS-enhanced (RCS-e) performs capability discovery.

In accordance with an aspect of the present invention, a method of performing capability discovery of Rich Communication Suite (RCS) in a portable terminal is provided. The method includes displaying a predetermined number of pieces of contact information from among registered contact information when a displaying of the registered contact information is requested, displaying the registered contact information so as to correspond with a user input when the user input is determined, and selecting currently displayed contact information and performing capability discovery with respect to the selected displayed contact information, when the user input is not determined during a predetermined time.

In accordance with another aspect of the present invention, an apparatus for performing capability discovery of RCS in a portable terminal is provided. The apparatus includes a memory storing information associated with contact information, a display unit to display the contact information, a wireless transceiving unit to provide a communication function for performing capability discovery, and a controller to control to display a predetermined number of pieces of contact information from among registered contact information when a displaying of the registered contact information is requested, to display the registered contact information to correspond with a user input when the user input is determined, and to, when the user input is not determined during a predetermined time, select currently displayed contact information and perform capability discovery with respect to the selected displayed contact information.

According to exemplary embodiments of the present invention, when a portable terminal that uses RCS or RCS-e performs capability discovery, the portable terminal performs capability discovery with respect to only such pieces of contact information that are selected by a user, and thus excessive data traffic is prevented from being generated and the consumption of a battery charge of the portable terminal may be minimized. The user may affirmatively select currently displayed contact information, or the user may passively select currently displayed contact information by refraining from entering a user input for a predetermined time when the desired selection of contact information is displayed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 1B is a diagram illustrating an example of tag information that is exchanged while capability discovery is performed according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
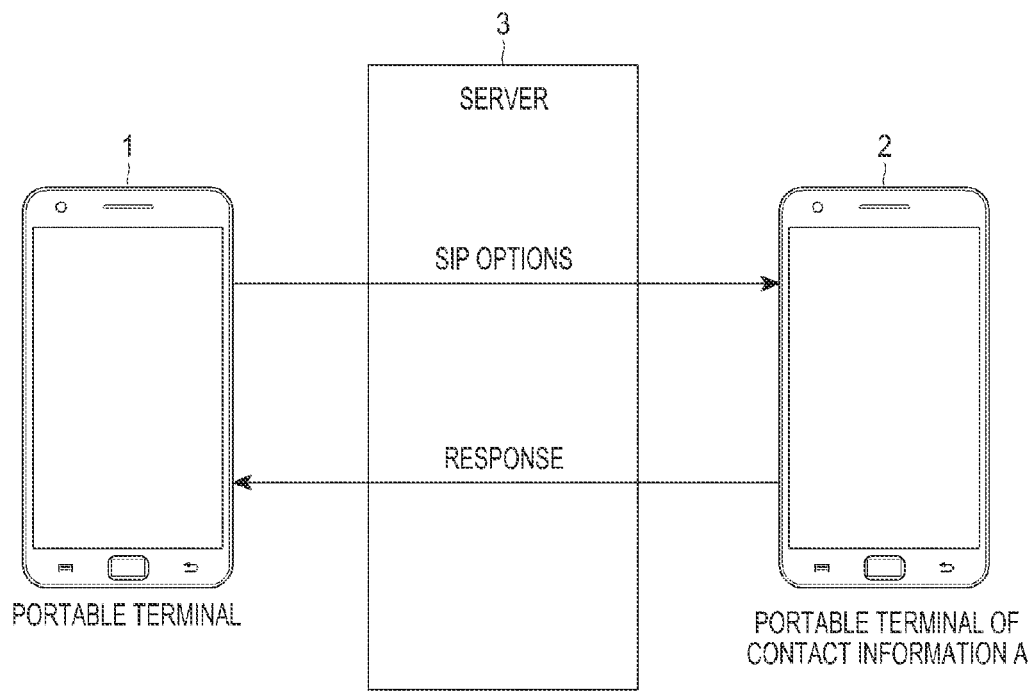
FIG. 1A is a block diagram illustrating a process of performing capability discovery according to an exemplary embodiment of the present invention.

FIG. 1A is a block diagram illustrating a process of performing capability discovery according to an exemplary embodiment of the present invention, and FIG. 1B is a diagram illustrating an example of tag information that is exchanged when capability discovery is performed according to an exemplary embodiment of the present invention.

Capability discovery in Rich Communication Suite (RCS) and RCS-enhanced (RCS-e) may be performed by exchanging a Session Initiation Protocol (SIP) OPTIONS message (SIP OPTIONS EXCHANGE). For example, performing the capability discovery in RCS (or RCS-e) may be understood as exchanging the SIP OPTIONS message.

Referring now to FIG. 1A, under an assumption that a portable terminal 1 determines whether RCS communication with a portable terminal 2 of contact information A is available (capability discovery), the portable terminal 1 transmits an SIP OPTIONS message to the portable terminal 2 of the contact information A in a phonebook through a predetermined server 3, and the portable terminal 2 of the contact information A transmits a Response message to the user portable terminal 1 through the server 3. For example, the contact information A may be a piece of information, for example, a name, a phone number, or an email address, that corresponds to a user of portable terminal 2. Here, the server 3 refers to a server of a communication network provider, and it is assumed that the server 3 provides a communication function of each portable terminal and an RCS service. However, the present invention is not limited thereto; for example, the SIP OPTIONS message and the Response message might be exchanged directly between two devices with no intervening server.

The portable terminal 1 determines a result of performing the capability discovery by determining a type of the Response message received from the portable terminal 2 of the contact information A through the server 3, and may notify the user of the result.

For example, the Response message of FIG. 1A may include various types of a Response message and representative examples of the Response message may include a Response message of 200 OK and a response message of 404 NOT FOUND.

The response message of 404 NOT FOUND or the equivalent may correspond to a message indicating that the user portable terminal 1 and the portable terminal 2 of the contact information A may not be able to use the RCS service. Examples of a similar response message may include a response message of 480 TEMPORARILY UNAVAILABLE, or a response message of 408 REQUEST TIMEOUT.

Conversely, the response message of 200 OK or the equivalent corresponds to a message indicating that the portable terminal 1 and the portable terminal 2 of the contact information A are able to use the RCS service. Further, tag information indicating a type of an available RCS service may be inserted into the response message of 200 OK. The tag information, as exemplarily illustrated in FIG. 1B, may be inserted into the response message of 200 OK, and the portable terminal 1 may determine, based on the tag information, the type of the available RCS service for the communication with the portable terminal 2 of the contact information A.

For example, when tag information of 4b is inserted into the response message of 200 OK, the portable terminal 1 may use a corresponding RCS service (instant messaging:

IM/CHAT) of 4a with the portable terminal 2 of the contact information A. Also, when tag information of 5b and 6b is inserted into the response message of 200 OK, the portable terminal 1 determines that it is able to use an RCS service of 5a and 6a (transferring a file and sharing an image, respectively) with the portable terminal 2 of the contact information A.

With respect to performing capability discovery (exchanging an SIP OPTIONS message) that has been described with reference to FIGS. 1A and 1B, the Global System for Mobile Communication Association (GSMA) has not standardized a method of exchanging the SIP OPTIONS message (based on rcs-e_advanced_comms_specification-v1.2.1). Therefore, the exemplary embodiments of the present invention provide a measure for improving the related-art method of performing capability discovery through the following exemplary embodiments.

Figure 2:
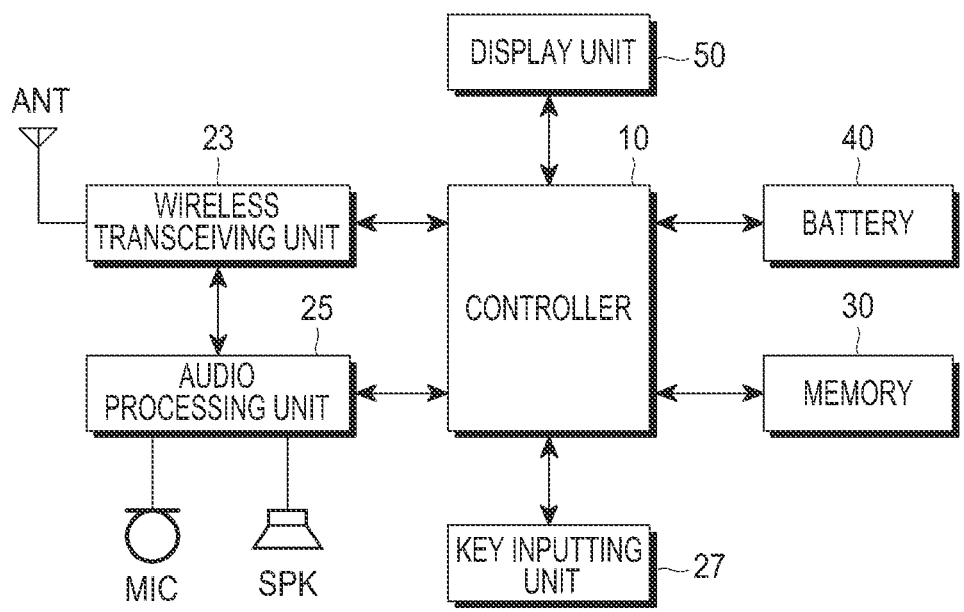
FIG. 2 is a block diagram illustrating a portable terminal according to an exemplary embodiment of the present invention.

FIG. 2 is a block diagram illustrating a portable terminal according to an exemplary embodiment of the present invention.

A portable terminal according to exemplary embodiments of the present invention is a portable electronic device that is capable of using an RCS service, and may correspond, for example, to a feature phone, a smart phone, a notebook computer operated in a Windows or Mac environment, and the like. Here, it is assumed that the smart phone is a portable terminal operated by a mobile Operating System (OS) such as, for example, Tablet, Windows 8, iOS, Android, Bada, and the like.

Referring now to FIG. 2, a wireless transceiving unit 23 includes a Radio Frequency (RF) unit (not shown) and a modem (not shown). The RF unit may include an RF transmitter that up-converts and amplifies a frequency of a transmitted signal, an RF receiver that low-noise amplifies a received signal and down-converts a frequency, and the like. The modem may include a transmitter that encodes and modulates a signal to be transmitted, a receiver that demodulates and decodes a signal received from the RF unit, and the like.

The wireless transceiving unit 23 according to exemplary embodiments of the present invention provides a communication function used for performing capability discovery. Therefore, typically through communication with a server (not illustrated) using the wireless transceiving unit 23 according to exemplary embodiments of the present invention, a controller 10 transmits an SIP OPTIONS message associated with a piece of predetermined contact information registered in a phonebook or the equivalent and receives a Response message in response to the transmission, and performs capability discovery with respect to the corresponding contact information. Subsequently, the controller 10 controls to update RCS capability information of the corresponding contact information based on a result of performing the capability discovery. Here, the server (not illustrated) may correspond to a server of a mobile communication provider and the like, and it is assumed that the server provides the portable terminal with a data communication function including a voice communication function, and an RCS or RCS-e service.

An audio processing unit 25 may form a COder-DECoder (codec) (not shown), and the codec may include a data codec and an audio codec. The data codec processes packet data and the like, and the audio codec processes an audio signal such as a voice file, a multimedia file, and the like. The audio processing unit 25 converts a digital audio signal received from the modem into an analog signal through the audio codec so as to play back the analog signal through a speaker SPK, or converts an analog audio signal generated from a microphone MIC into a digital audio signal through the audio codec so as to transmit the digital audio signal to the modem. The codec may be included separately, or may alternatively be included in the controller 10.

The controller 10 controls so as to provide the user with a result of performing capability discovery with respect to predetermined contact information (for example, a predetermined piece of contact information registered in a phonebook) as sound information, using the audio processing unit 25 according to exemplary embodiments of the present invention.

A key inputting unit 27 may include hard or soft keys for inputting number and character information, functional keys for setting various types of functions, a touch pad, and the like. When a display unit 50 is embodied as a touch screen, for example, a capacitive touch screen, a resistive touch screen, or the like, the key inputting unit 27 may include predetermined keys at the minimum, and the display unit 50 may then be substituted for a part or all of a key input function of the key inputting unit 27. For example, a touch screen can combine the functions of the display unit 50 and the key inputting unit 27 in a single unit.

The user may manually request capability discovery with respect to predetermined contact information using the key inputting unit 27 according to exemplary embodiments of the present invention, and the controller 10 may perform capability discovery with respect to the contact information in response to the request, and may notify the user of a result of performing the capability discovery.

A memory 30 may include a program memory (not shown) and a data memory (not shown). The program memory may store a program such as an OS for controlling a general operation of the portable terminal, as well as various executable applications. The memory 30 may further include an external memory (not shown), for example, a Compact Flash (CF) memory, a Secure Digital (SD) memory, a Micro-Secure Digital (Micro-SD) memory, a Mini Secure Digital (Mini-SD) memory, an Extreme Digital (xD) memory, a memory stick, and the like. Also, the memory 30 may include a disk (not shown), for example, a Hard Disk Drive (HDD), a Solid State Disk (SSD), and the like. The data memory, if present, stores various temporary and persistent data generated or received during use of the portable terminal.

The memory 30 according to exemplary embodiments of the present invention stores a phonebook that stores information associated with contact information set by the user, and stores a result of performing capability discovery with respect to each piece of the contact information stored in the phonebook in a form of a DataBase (DB) (for example, an RCS DB). In this example, the RCS DB may be stored separately from the phonebook, and may alternatively be incorporated into the stored phonebook. Subsequently, the controller 10 may determine the result of performing capability discovery corresponding to each piece of contact information based on the RCS DB, and notify the user of the result.

A battery 40 provides power that enables the portable terminal to operate, and the controller 10 controls operation of the portable terminal by adjusting the provided power to a level used by each component element of the portable terminal and providing the adjusted power. The controller 10 may receive information associated with a charge level of the battery 40 (that is, a remaining capacity of the battery 40), a temperature of the battery 40, and the like through a management unit (not illustrated) of the battery. The controller 10 may control operation of the portable terminal in accordance with a usage and remaining charge of the battery 40.

The display unit 50 may be configured as a Liquid Crystal Display (LCD), an Organic Light Emitting Diode (OLED) display, or the like, and outputs various display information generated from the portable terminal. The display unit 50 may include a touch screen, for example, a capacitive touch screen, a resistive touch screen, and the like and thus, may function as an input unit that controls the portable terminal, along with the key inputting unit 27, as discussed above.

The controller 10 controls to display RCS capability information of each piece of contact information that is updated by performing capability discovery with respect to each of the pieces of contact information stored in the phonebook, using the display unit 50 according to exemplary embodiments of the present invention. For example, the display unit 50 according to exemplary embodiments of the present invention displays RCS capability information of each piece of contact information when each piece of contact information (for example, a name, a phone number, and the like) is displayed in the phonebook. Examples of the RCS capability information may include information associated with whether an RCS service for communication with corresponding contact information is available, information associated with an available RCS service, and the like.

The controller 10 may control a general operation of the portable terminal according to exemplary embodiments of the present invention, and may convert and control the operation of the portable terminal based on a user input that is input through the key inputting unit 27, the display unit 50, or the like. When displaying the registered contact information is requested, the controller 10 according to exemplary embodiments of the present invention controls a process of displaying a predetermined number of pieces of contact information from among the registered contact information, a process of displaying the registered contact information so as to correspond with a user input when the user input is determined, and a process of performing capability discovery with respect to each of the currently displayed contact information when the user input is not determined during a predetermined time. The user input may, for example, be in a form of a scroll. Detailed operations of the controller 10 according to exemplary embodiments of the present invention will be described in detail.

Although devices that may be included in the portable terminal, such as a Bluetooth module, a camera module, a Global Positioning System (GPS) module, a Wi-Fi module, a proximity sensor, a Digital Media Broadcasting (DMB) receiver, and the like, are not illustrated in FIG. 2, it will be apparent to those skilled in the art that such devices may be included in the portable terminal and may provide corresponding functions without departing from the scope or spirit of the disclosed invention.

For example, a Wi-Fi module may provide a communication function used for performing capability discovery, replacing the wireless transceiving unit 23. The Wi-Fi module may communicate with another portable terminal directly, for example, without a server intervening.

Figure 3:
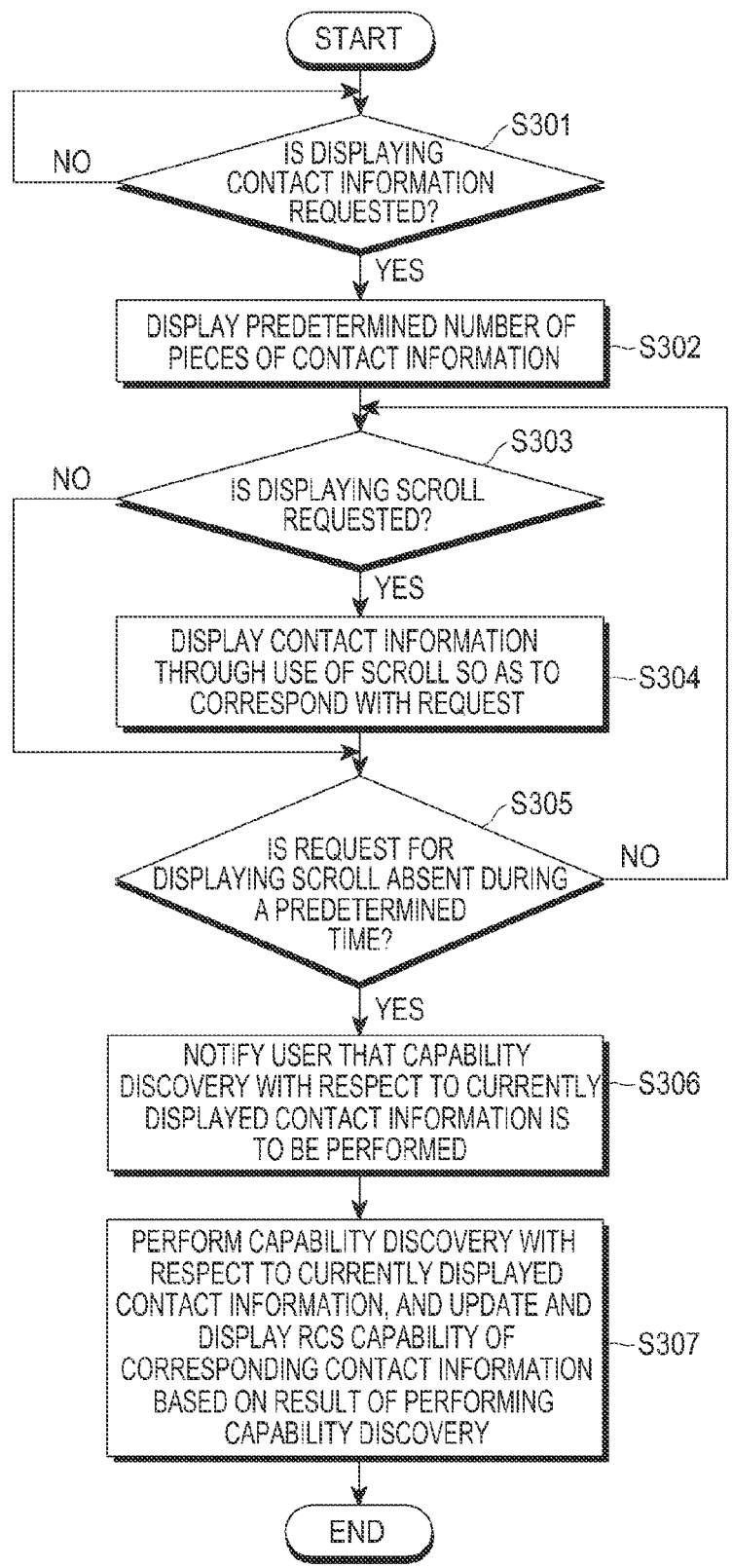
FIG. 3 is a flowchart illustrating a process that performs capability discovery of Rich Communication Suite (RCS) according to an exemplary embodiment of the present invention.
Figure 4A:
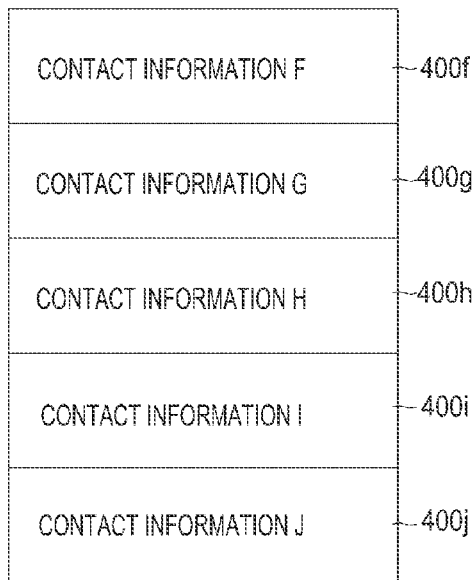
FIG. 4A is a diagram illustrating a first example of a process that performs capability discovery of RCS according to an exemplary embodiment of the present invention.
Figure 4A:
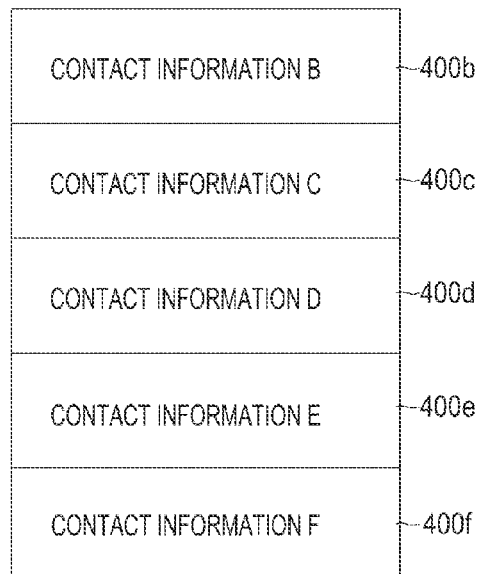
Figure 4A:
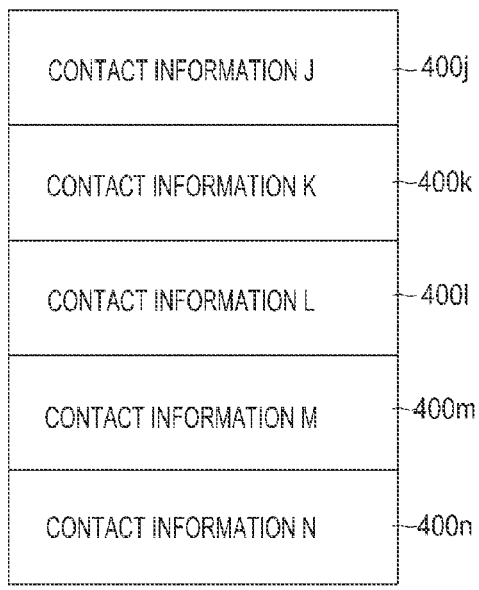
Figure 4A:
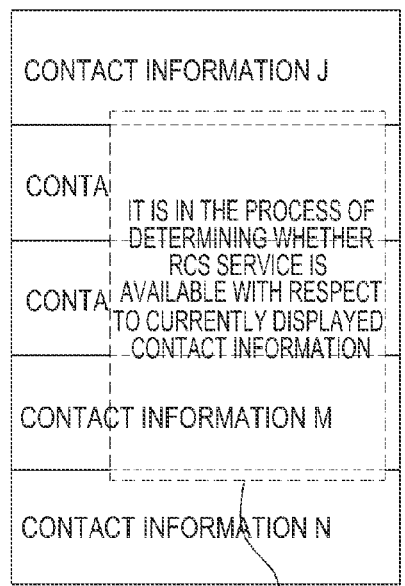
Figure 4B:
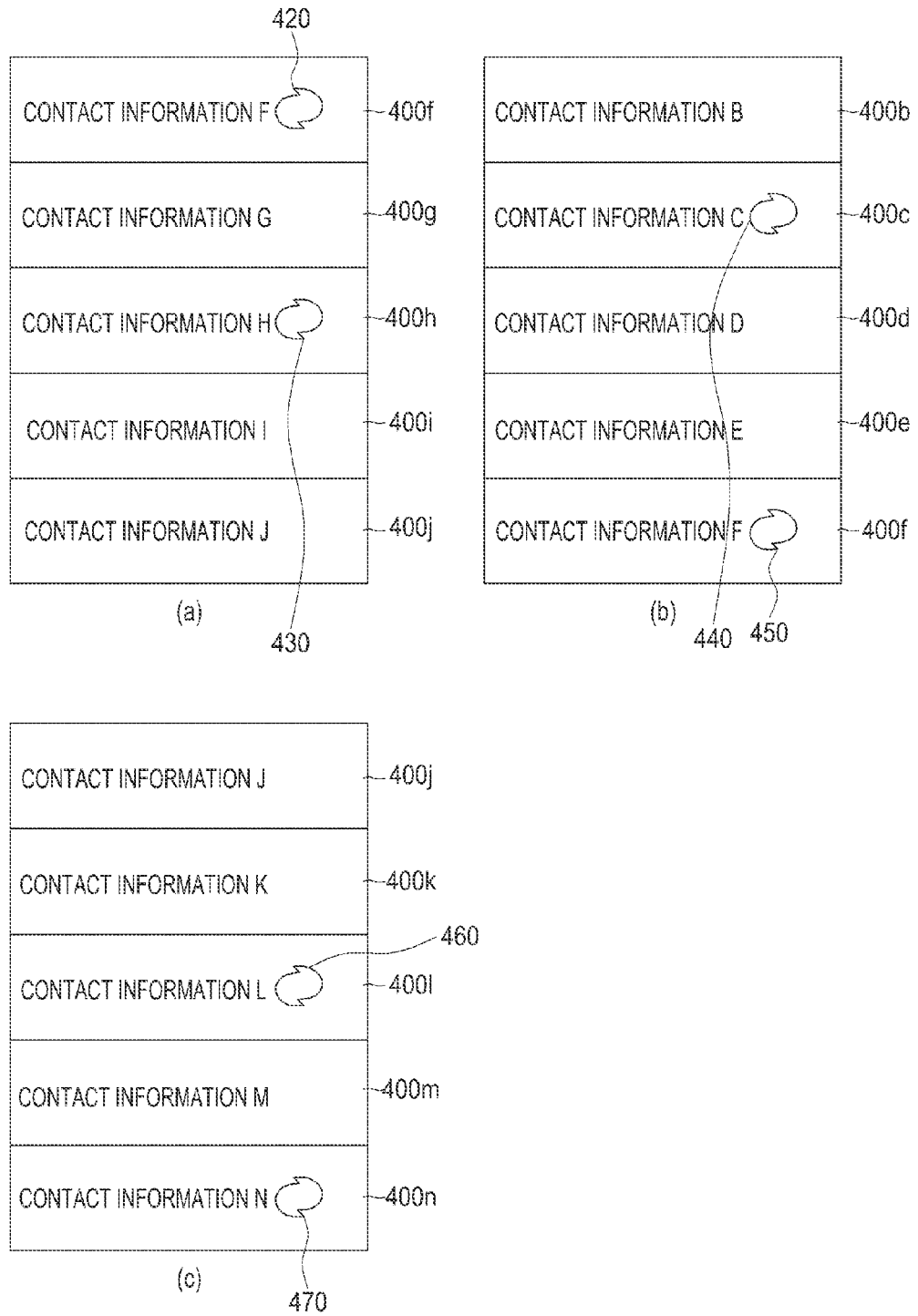
FIG. 4B is a diagram illustrating a second example of a process that performs capability discovery of RCS according to an exemplary embodiment of the present invention.

FIG. 3 is a flowchart illustrating a process that performs capability discovery of RCS according to an exemplary embodiment of the present invention. FIGS. 4A and 4B are diagrams illustrating a first example and a second example of a process that performs capability discovery of RCS according to exemplary embodiments of the present invention. Exemplary embodiments of the present invention will be described with reference to FIGS. 3 through 4B.

Referring now to FIG. 3, in steps S301 and S302, when the displaying of registered contact information is requested, the controller 10 controls to display a predetermined number of pieces of contact information from among the registered contact information.

A user may request a displaying of the registered (for example, stored) contact information by, for example, executing a menu entry or an application. When the displaying of the contact information is requested, the controller 10 controls to display a predetermined number of pieces of contact information that may be set, in advance, based on criteria such as a size of a display screen, or display settings associated with resolution such as Dots Per Inch (DPI) settings.

Referring now to screen (a) of FIG. 4A, for example, when the display is set to display five pieces of contact information in the display screen, the controller 10 controls to display five pieces of contact information from 400f to 400j. In this example, the number of pieces of displayed contact information may be changed, for example, by adjusting the DPI or an application that adjusts the DPI.

According to exemplary embodiments of the present invention, when a predetermined number (for example, five) of pieces of contact information (for example, a phone number, an email address, an IDentifier (ID), and the like) is displayed, a communication history (stored in a memory) such as message history, a call history, an e-mail history, and the like may be determined and the predetermined number of contact information may be displayed based on the determined history.

For example, when the displaying of registered contact information is requested, the controller 10 according to exemplary embodiments of the present invention may control to determine the communication history and to display a predetermined number of pieces of contact information corresponding to recently performed communication from among the registered contact information. The pieces of contact information may be displayed, for example, in chronological order or reverse chronological order. Referring to screen (a) of FIG. 4A, when it is set to display five pieces of contact information, the controller 10 controls to display five pieces of contact information corresponding to recently performed communication. Among the five displayed pieces of contact information, the contact information f corresponds to the most recently performed communication and the contact information j corresponds to the least recently performed communication.

As another example, when the displaying of the registered contact information is requested, the controller 10 according to exemplary embodiments of the present invention may control to determine the communication history and to display a predetermined number of pieces of contact information corresponding to frequently performed communication in an order of decreasing or increasing frequency from among the registered contact information.

Referring to screen (a) of FIG. 4A, when it is set to display five pieces of contact information, the controller 10 controls to display five pieces of contact information corresponding to frequently performed communication. Among the five pieces of contact information, the contact information f corresponds to the most frequently performed communication and the contact information j corresponds to the least frequently performed communication.

Any basis may be used to determine the displayed pieces of contact information and the order thereof.

In steps S303 and S304, when a user input, for example, a scroll, is determined, the controller 10 controls to display the registered contact information through use of the scroll so as to correspond with the user input. The user may input the scroll motion to bring different contact information into display. The user may repeatedly input the scroll motion if each subsequent scroll input is within a predetermined time of the previous input. The user may thus scroll through any amount of contact information until a desired selection of contact information is displayed. The scroll motion may be input by any of various means, including but not limited to a touch and drag motion on a touchscreen, a flicking motion on a touchscreen, touching a directional soft key on a touchscreen, or pressing a hard key on the portable terminal.

As described in the foregoing, the number of pieces of contact information to be displayed at one time in the display screen is determined in advance, and when a large number of pieces of contact information needs to be displayed, the contact information may not all be displayed together in the display screen. Therefore, the user may request the displaying of remaining contact information in addition to the displayed contact information, for example, through a scroll input (a user input corresponding to the scroll), using a key of the key inputting unit 27 and/or a touch screen of the display unit 50.

For example, when contact information is registered in alphabetical order from contact information A to contact information N, and the contact information is displayed as illustrated in screen (a) of FIG. 4A, the user may request the displaying of the registered contact information as illustrated in screen (b) and screen (c) of FIG. 4A through a scroll input. Therefore, the user may request the displaying of contact information (for example, contact information 400b through 400e) before the contact information F and contact information (for example, contact information 400 j through 400 n) after the contact information J, respectively.

In steps S305 through S307, when a user input corresponding to the scroll is not determined during a predetermined time, the controller 10 controls to perform capability discovery with respect to each of the currently displayed pieces of contact information, and to notify the user of a result of the capability discovery.

Through the descriptions associated with steps S301 through S304, it is described that the user may request displaying contact information stored (registered) in the portable terminal and may determine a list of the stored contact information through a scroll input.

To address the drawback of the related-art method that performs capability discovery with respect to all contact information, exemplary embodiments of the present invention determine that capability discovery is requested by the user when a user input, for example, corresponding to a scroll (that is, a scroll input), is not input during a predetermined time in a state where the contact information is displayed. Thus, when the predetermined time expires, the capability discovery is automatically performed with regard to the currently displayed contact information. On the other hand, the user may input the scroll motion within the predetermined time to display a different selection of contact information. The expiration of the predetermined time is counted from the most recent scrolling of the information, and thus is reset with each user input of the scroll motion. The user may thus repeatedly input the scroll motion until a desired selection of contact information is displayed.

Therefore, when a user input corresponding to a scroll (that is, a scroll input) is not determined during the predetermined time (for example, at least one second), the controller 10 according to exemplary embodiments of the present invention may control to automatically perform capability discovery with respect to each of the currently displayed pieces of contact information. In this example, the controller 10 according to exemplary embodiments of the present invention may notify the user that capability discovery is to be performed before the capability discovery is performed, as in step S306.

Under an assumption that the user requests the performing of capability discovery with respect to the contact information J through the contact information N, referring to FIGS. 4A and 4B, the user may not input a scroll input and wait during at least a predetermined time in a state where a total of five pieces of contact information from the contact information J through the contact information N (from 400j through 400n) are displayed, as illustrated in screen (c) of FIG. 4A through a scroll input in a display screen of screen (a) or screen (b) of FIG. 4A.

When the contact information is displayed as illustrated in screen (c) of FIG. 4A and a scroll input is not input during at least a predetermined time, the controller 10 determines that performing the capability discovery with respect to the displayed contact information J through the contact information N of 400j through 400n is requested.

As described in the foregoing, the controller 10 controls to notify the user of the performing of the capability discovery with respect to the displayed contact information (the contact information J through the contact information N) as illustrated in a notice 410 of screen (d) of FIG. 4A, and to automatically perform the capability discovery with respect to the corresponding contact information.

Subsequently, the controller 10 updates an RCS database when the capability discovery with respect to each of the displayed pieces of contact information is completed, and displays, based on a result of the capability discovery, an updated RCS capability (for example, information associated with whether an RCS service is available, information associated with a type of an available RCS service, and the like) of the contact information, as illustrated in screens (a), (b), and (c) of FIG. 4B.

When the capability discovery is performed in a state where the contact information is displayed, as illustrated in screen (a) of FIG. 4A, and it is determined that the contact information F and the contact information H are able to use an RCS service, the controller 10 updates an RCS capability with respect to the contact information F through the contact information J as illustrated in screen (a) of FIG. 4B. That is, the controller 10 controls to update a display screen of screen (a) of FIG. 4A to a display screen of screen (a) of FIG. 4B by performing the capability discovery, and to notify the user that the contact information F and the contact information H where an icon 420 and an icon 430, respectively, are displayed are able to use the RCS service. If information corresponding to the type of available RCS service is received, the icon may correspond to the type of available RCS service.

In a similar manner, when capability discovery is performed in a state where contact information is displayed as illustrated in screen (b) of FIG. 4A, and it is determined that the contact information C and the contact information F are able to use the RCS service, the controller 10 updates and displays an RCS capability with respect to the contact information B through contact information F as illustrated in screen (b) of FIG. 4B. That is, the controller 10 controls to update a display screen of screen (b) of FIG. 4A to a display screen of screen (b) of FIG. 4B by performing the capability discovery, and to notify the user that the contact information C and the contact information F where an icon 440 and an icon 450, respectively, are displayed are able to use the RCS service.

In a similar manner, when capability discovery is performed in a state where contact information is displayed as illustrated in screen (c) of FIG. 4A, and it is determined that the contact information L and the contact information N are able to use the RCS service, the controller 10 updates and displays an RCS capability with respect to the contact information J through contact information N as illustrated in screen (c) of FIG. 4B. That is, the controller 10 controls to update a display screen of screen (c) of FIG. 4A to a display screen of screen (c) of FIG. 4B by performing the capability discovery, and to notify the user that the contact information L and the contact information N where an icon 460 and an icon 470, respectively, are displayed are able to use the RCS service.

Subsequently, the user may select one of the pieces of contact information where icons 420, 430, 440, 450, 460, and 470 are displayed in FIG. 4B so as to request RCS communication with the selected contact information, and the controller 10 may control to provide, to the user, the RCS service with the corresponding contact information.

Although the examples given have described automatically performing capability discovery on all pieces of contact information in the displayed selection, the present invention is not limited thereto. For example, a user may select the displayed contact information on which to perform capability discovery, and the portable terminal will then perform the capability discovery immediately on the selected displayed contact information. Thus, for example, a user may elect to perform capability discovery immediately when the desired selection of contact information is displayed, without waiting for the expiration of the predetermined time.

The exemplary embodiments of the present invention perform capability discovery with respect to only contact information selected by the user when a portable terminal that uses RCS or RCS-e performs capability discovery and thus may prevent excessive data traffic from being generated and may minimize the consumption of a battery charge of the portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of performing capability discovery of rich communication suite (RCS) in a portable terminal, the method comprising:
   displaying registered contacts;
   performing, if a user input for checking the registered contacts is not inputted during a predetermined time, capability discovery with respect to only currently displayed contacts, from among the registered contacts, on a display of the portable terminal;
   updating the currently displayed contacts by including, in the currently displayed contacts, information on one or more indicators indicating that an RCS service between the portable terminal and a corresponding portable terminal is enabled based on a result of the capability discovery; and
   displaying the updated contacts along with the one or more indicators indicating that the RCS service between the portable terminal and the corresponding portable terminal is enabled.

2. The method of claim 1, wherein the user input comprises a scroll input.

3. The method of claim 1, wherein performing the capability discovery comprises:
   notifying, if the user input for checking the registered contacts is not inputted during the predetermined time, a user that the capability discovery is to be performed with respect to only the currently displayed contacts; and
   performing the capability discovery with respect to only the currently displayed contacts.

4. The method of claim 1, wherein displaying the registered contacts comprises:
   checking a communication history if the displaying of the registered contacts is requested; and
   displaying the registered contacts in chronological order of recently performed communication for each of the registered contacts.

5. The method of claim 1, wherein displaying the registered contacts comprises:
   checking a communication history if the displaying of the registered contacts is requested; and
   displaying the registered contacts in order of frequently performed communication for each of the registered contacts.

6. The method of claim 1, further comprising:
   updating an RCS database based on the result of the capability discovery if the capability discovery with respect to the currently displayed contacts is completed; and
   displaying an updated RCS capability with respect to the currently displayed contacts, based on the updated RCS database.

7. A portable terminal for performing capability discovery of rich communication suite (RCS), the portable terminal comprising:
   a display configured to display registered contacts; and
   a controller configured to:
      perform, if a user input for checking the registered contacts is not inputted during a predetermined time, capability discovery with respect to only currently displayed contacts, from among the registered contacts, on the display,
      update the currently displayed contacts by including, in the currently displayed contacts, information on one or more indicators indicating that an RCS service between the portable terminal and a corresponding portable terminal is enabled based on the capability discovery, and
      display, on the display, the updated contacts along with the one or more indicators indicating that the RCS service between the portable terminal and the corresponding portable terminal is enabled.

8. The portable terminal of claim 7, wherein the user input comprises a scroll input.

9. The portable terminal of claim 7, wherein the controller is further configured to:
   notify, if the user input for checking the registered contacts is not inputted during the predetermined time, a user that capability discovery is to be performed with respect to only the currently displayed contacts, and
   perform the capability discovery with respect to only the currently displayed contacts.

10. The portable terminal of claim 7, wherein the controller is further configured to:

check a communication history if the displaying of the registered contacts is requested, and display, on the display, the registered contacts in chronological order of recently performed communication for each of the registered contacts.

11. The portable terminal of claim 7, wherein the controller is further configured to:

check a communication history if the displaying of the registered contacts is requested, and display, on the display, the registered contacts in order of frequently performed communication for each of the registered contacts.

12. The portable terminal of claim 7, wherein the controller is further configured to:

update an RCS database based on the result of the capability discovery if the capability discovery with respect to the currently displayed contacts is completed; and display, on the display, an updated RCS capability with respect to the currently displayed contacts, based on the updated RCS database.

* * * * *